(12) United States Patent
Golden

(10) Patent No.: US 12,533,916 B2
(45) Date of Patent: Jan. 27, 2026

(54) WALKING BEAM SUSPENSION ASSEMBLY

(71) Applicant: Wackjobdesigns, LLC, Yankton, SD (US)

(72) Inventor: Randall S Golden, Yankton, SD (US)

(73) Assignee: Randall S Golden, Yankton, SD (US)

( * ) Notice: Subject to any disclaimer, the term of this patent is extended or adjusted under 35 U.S.C. 154(b) by 0 days.

(21) Appl. No.: 18/409,570

(22) Filed: Jan. 10, 2024

(65) Prior Publication Data
US 2025/0222733 A1    Jul. 10, 2025

(51) Int. Cl.
| | |
|---|---|
| *B60G 5/06* | (2006.01) |
| *B60G 7/00* | (2006.01) |
| *B60G 7/02* | (2006.01) |
| *B60G 11/27* | (2006.01) |

(52) U.S. Cl.
CPC .............. *B60G 5/06* (2013.01); *B60G 7/001* (2013.01); *B60G 7/02* (2013.01); *B60G 11/27* (2013.01); *B60G 2200/318* (2013.01); *B60G 2202/152* (2013.01); *B60G 2204/143* (2013.01); *B60G 2204/41* (2013.01)

(58) Field of Classification Search
CPC .. B60G 11/62; B60G 17/0521; B60G 99/004; B60G 99/008; B60G 2202/14; B60G 5/02; B60G 2200/318; B60G 2204/125; B60G 2204/126
USPC ......................................................... 280/677
See application file for complete search history.

(56) References Cited

U.S. PATENT DOCUMENTS

| | | | | |
|---|---|---|---|---|
| 2,493,026 | A * | 1/1950 | Pointer ................... | B60G 15/02 384/282 |
| 3,618,971 | A * | 11/1971 | Wragg .................... | B60G 11/22 280/681 |
| 3,984,125 | A * | 10/1976 | Paton ....................... | F16F 7/09 280/681 |
| 4,061,361 | A * | 12/1977 | Felburn .................... | B60G 5/06 280/681 |
| 4,193,612 | A * | 3/1980 | Masser .................... | B60G 5/02 280/681 |
| 4,202,564 | A * | 5/1980 | Strader .................... | B60G 5/04 280/678 |
| 4,789,181 | A * | 12/1988 | Baxter ..................... | B60G 5/02 280/681 |
| 5,354,091 | A * | 10/1994 | Baxter ..................... | B60G 5/03 267/52 |
| 6,206,407 | B1 * | 3/2001 | Fuchs .................... | B60G 11/42 280/686 |
| 6,499,184 | B2 * | 12/2002 | Plate .................... | B60B 33/045 16/29 |

(Continued)

OTHER PUBLICATIONS

[H] Technical Procedure, Haulmaax® Rear Suspension, Subject: Service Instructions, Lit No. 17730-244, Date: Oct. 2019, Revision I, 68 pages.

*Primary Examiner* — Paul N Dickson
*Assistant Examiner* — Caitlin Anne Miller
(74) *Attorney, Agent, or Firm* — Scot Ringenberg

(57) ABSTRACT

A walking beam suspension assembly may include, but is not limited to: a beam portion including: a central body portion; and at least one mounting bushing disposed through the beam portion; a linkage rotatably coupled to the frame portion via at least one linkage pivot bushing; and one or more elastically deformable members coupled to the linkage and configured to abut the central body portion.

15 Claims, 11 Drawing Sheets

(56) References Cited

U.S. PATENT DOCUMENTS

| | | | |
|---|---|---|---|
| 6,916,037 B2 * | 7/2005 | Baxter | B60G 5/00 |
| | | | 280/124.18 |
| 6,951,260 B1 * | 10/2005 | Isley | B62D 55/104 |
| | | | 280/681 |
| 8,256,782 B2 * | 9/2012 | VanDenberg | B60G 11/225 |
| | | | 280/124.128 |
| 8,720,937 B2 * | 5/2014 | Noble | B60G 11/24 |
| | | | 267/141.1 |
| 9,096,109 B2 * | 8/2015 | Wood | B60G 5/01 |
| 10,532,620 B1 * | 1/2020 | Klein | B60G 5/065 |

* cited by examiner

WALKING BEAM SUSPENSION ASSEMBLY

TECHNICAL FIELD

The present disclosure generally relates to the field of vehicle suspension systems, and more particularly, to a system of resilient members configured to compress and expand as a linkage rotates about a linkage pivot.

BRIEF DESCRIPTION OF THE DRAWINGS

The numerous advantages of the disclosure may be better understood by those skilled in the art by reference to the accompanying figures in which.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Figure 4:
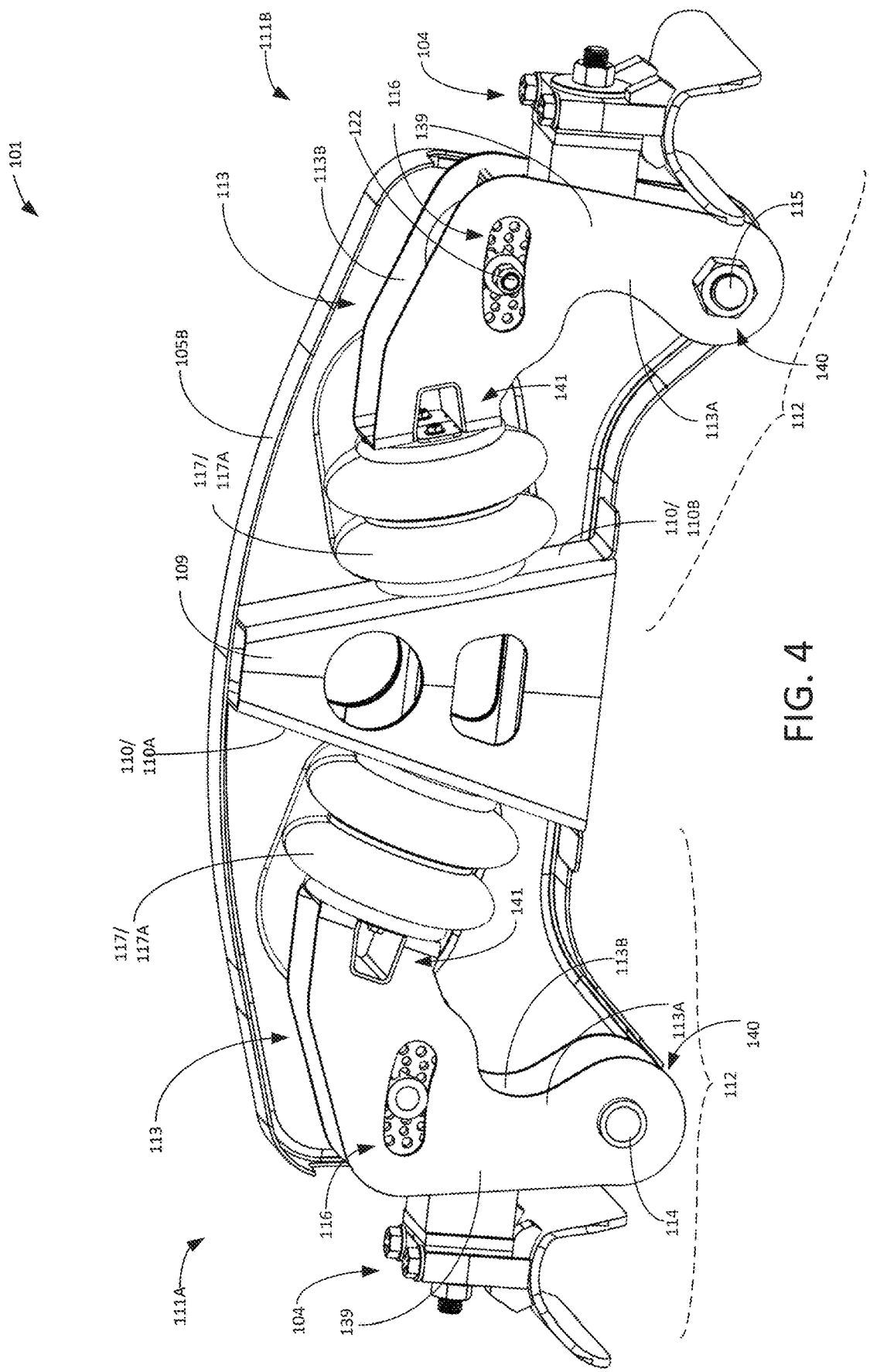
FIG. 4 shows a cut-away view of a walking beam suspension assembly.

Referring to FIG. 4, a cut-away view of the walking beam suspension assembly 101 is shown with the first beam panel 105A of the beam portion 102 removed. The beam portion 102 may further include a central body portion 109 disposed between the first beam panel 105A and the second beam panel 105B. In one example, the central body portion 109 may have an A-frame configuration including a first central body surface 110A oriented at least partially toward a first end 111A of the walking beam suspension assembly 101 and a second central body surface 110B oriented at least partially toward a second end 111B of the walking beam suspension assembly 101.

The walking beam suspension assembly 101 include a shock absorbing assembly 112. The shock absorbing assembly 112 may include a linkage 113. The linkage 113 may include one or more linkage plates 113A and/or 113B which are rotatably coupled to the beam portion 102 via a linkage pivot bushing 114 retained by a bolt and locking nut 115. The linkage 113 may each include an arcuate slot 116 which may allow for limited travel of the linkage 113 relative to the beam portion 102 as the linkage 113 rotates about the linkage pivot bushing 114.

Figure 5:
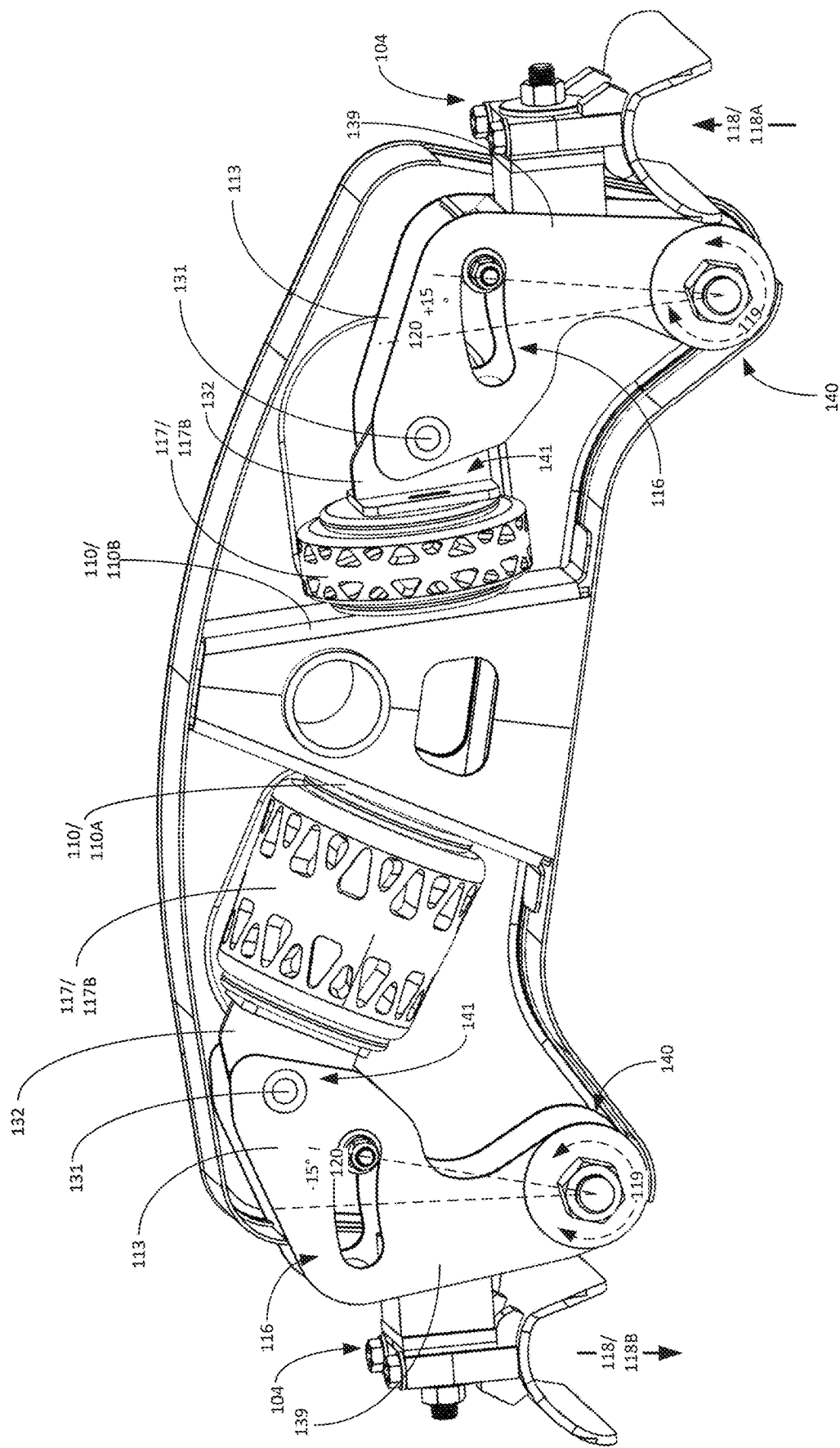
FIG. 5 shows a cut-away view of a walking beam suspension assembly.
Figure 6:
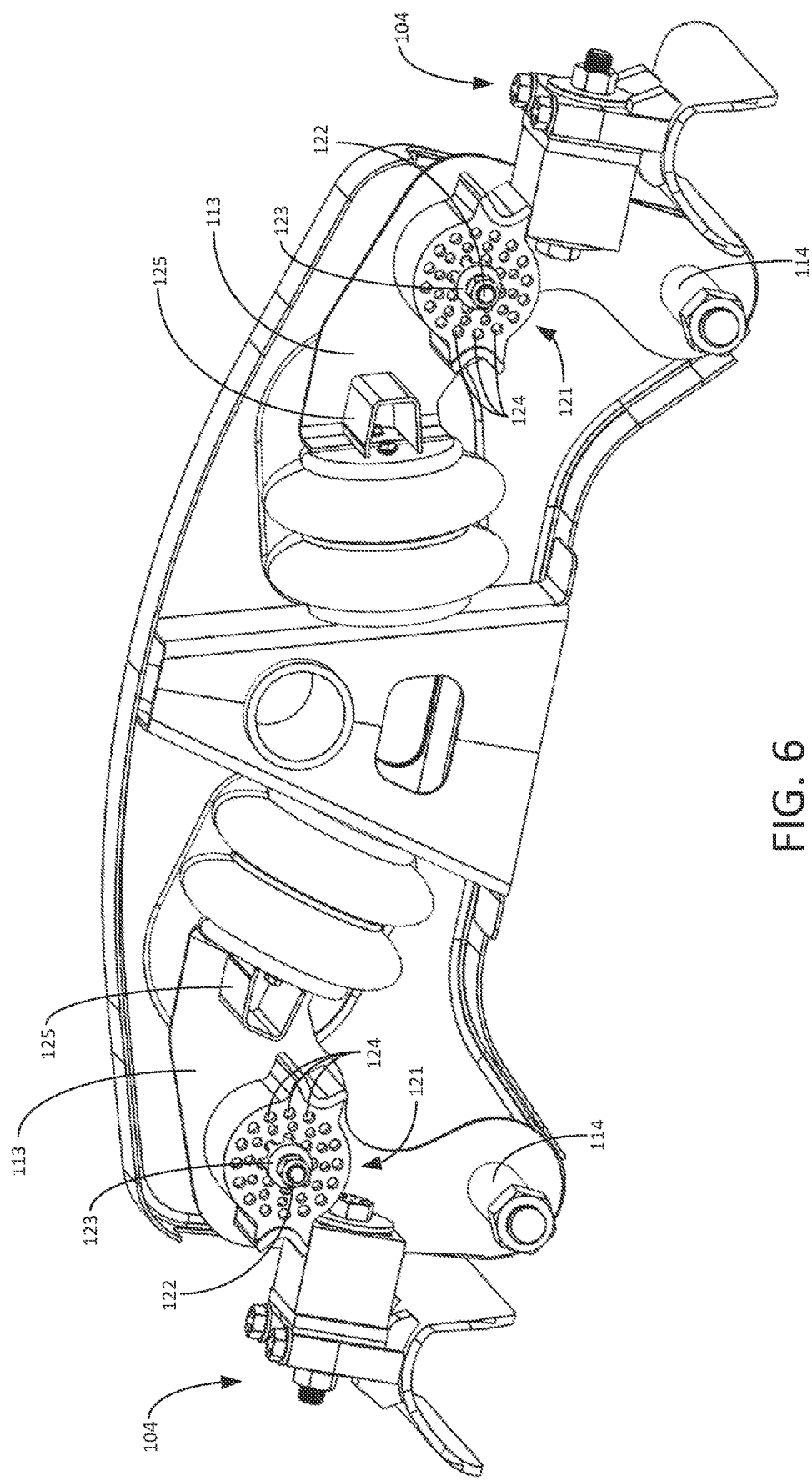
FIG. 6 shows a cut-away view of a walking beam suspension assembly.

The shock absorbing assembly 112 may further include one or more elastically deformable members 117. In one example, as shown in FIGS. 1-5, the elastically deformable members 117 may include one or more air bags 117A (e.g., one or more FD 120-20 CI Double Convolution Air Actuators manufactured by Continental Industry) operably coupled to a compressed air source (not shown). In another example, as shown in FIG. 6, the elastically deformable members 117 may include one or more rubber ride members 117B having one or more cutouts allowing for elastic deformation.

Referring to FIG. 4, a cut-away view of the walking beam suspension assembly 101 is shown with the first beam panel 105A of the beam portion 102 removed. The beam portion 102 may further include a central body portion 109 disposed between the first beam panel 105A and the second beam panel 105B. In one example, the central body portion 109 may have an A-frame configuration including a first central body surface 110A oriented at least partially toward a first end 111A of the walking beam suspension assembly 101 and a second central body surface 110B oriented at least partially toward a second end 111B of the walking beam suspension assembly 101.

The walking beam suspension assembly 101 include a shock absorbing assembly 112. The shock absorbing assembly 112 may include a linkage 113. The linkage 113 may include one or more linkage plates 113A and/or 113B which are rotatably coupled to the beam portion 102 via a linkage pivot bushing 114 retained by a locking nut 115. The linkage 113 may each include an arcuate slot 116 which may allow for limited travel of the linkage 113 relative to the beam portion 102 as the linkage 113 rotates about the linkage pivot bushing 114.

The shock absorbing assembly 112 may further include one or more elastically deformable members 117. In one example, as shown in FIGS. 1-5, the elastically deformable members 117 may include one or more air bags 117A (e.g., one or more FD 120-20 CI Double Convolution Air Actuators manufactured by Continental Industry) operably coupled to a compressed air source (not shown). In another example, as shown in FIG. 6, the elastically deformable members 117 may include one or more rubber ride members 117B having one or more cutouts allowing for elastic deformation.

Referring to FIG. 6, the elastically deformable members 117 may be configured to abut or otherwise physically engage a central body surface 110 of the central body portion 109 such that movement of the linkage 113 results in compression or expansion of the elastically deformable members 117 relative to the central body surface 110. For example, the axle supports 104 may be coupled to the linkage 113 such than an application of force 118 to the axle supports 104 (e.g., an upward force 118B induced by vehicle wheel assemblies 202 attached to the axle supports 104 encountering a bump; or downward force induced by vehicle wheel assemblies 202 attached to the axle supports 104 encountering a depression in a road surface) may induce rotation 119 of the linkage 113 about the linkage pivot bushing 114 so as to travel within the beam portion 102 and either compress the elastically deformable members 117 (e.g., as shown with respect to elastically deformable member 117B) against a central body surface 110 of the central body portion 109 or pull the elastically deformable members 117 (e.g., as shown with respect to elastically deformable member 117A) away from the central body portion 109. Such movements by the elastically deformable members 117 serve to provide a shock-absorbing response to the force 118. In one example, as shown in FIG. 5, the linkage 113 may travel between an up-angle of +15° (e.g., responsive to force 118A) to down-angle of −15° (e.g., responsive to force 118B) relative a neutral midpoint 120 within the arcuate slot 116. Such a configuration permits for a 30° range of motion for the axle supports 104 and associated axle members 201/vehicle wheel assemblies 202.

Such a configuration may serve to reduce the force applied to the elastically deformable members 117 of the shock absorbing assembly 112 as compared to conventional, under-frame configurations of similar structures. In one example, the employment of the pivoting linkages 113 may reduce the forces applied to the elastically deformable members 117 by half relative to conventional, under-frame configurations of air bags. This may be accomplished via the additional pivot points provided by the linkage pivot bushing 114 may, when combined with the rotation 108 of the beam portion 102 around the mounting bushing 106, serving as additional force equalizers to further smooth load handling by the walking beam suspension assembly 101. The ability of each of the axle members 201 of a vehicle to articulate independently of the beam portion 102 via their associated shock absorbing assembly 112 further dampens any vibrations. It will be recognized above-referenced departure angle values are merely exemplary and additional ranges are contemplated depending on the potential degree of force 118 applied to the axle supports 104, the required travel distance of the linkage 113, and the elastic capabilities of the elastically deformable members 117.

Further referring to FIG. 5, a linkage 113 may including an additional pivot point 131 couplable to a bracket 132 supporting the elastically deformable members 117. The pivot point 131 may allow for an additional range of motion for the linkage 113 so as to permit the elastically deformable members 117 to expand and contract in a manner more perpendicular to the central body surface 110 so as to minimize shear forces at the connection between the elastically deformable members 117 and the central body surface 110.

Figure 3:
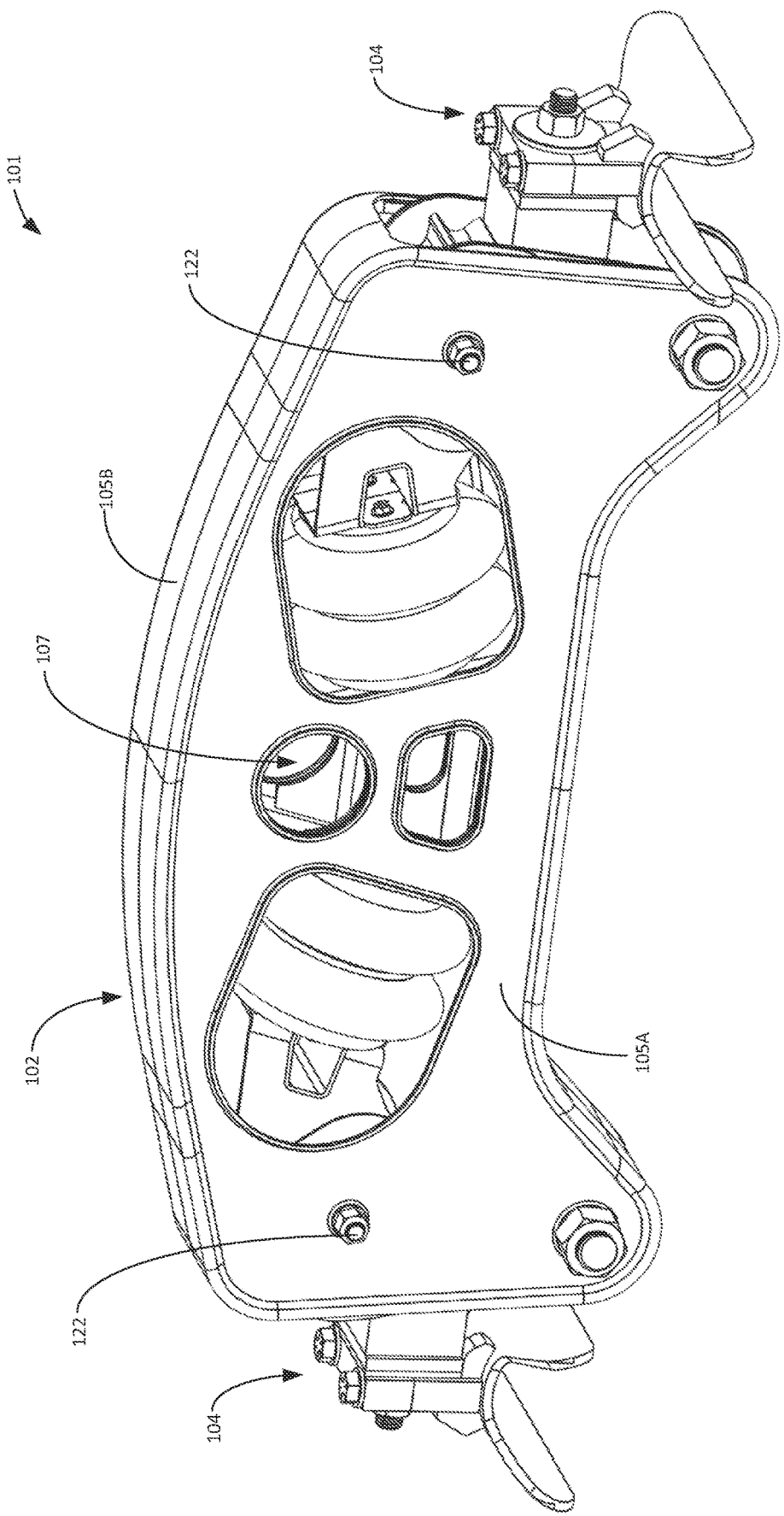
FIG. 3 shows a perspective view of a walking beam suspension assembly.

Referring to FIG. 6, the walking beam suspension assembly 101 may further include at least one snubber assembly 121. Referring to FIGS. 3,4 and 6, the snubber assembly 121 may retained in position by a slot bolt 122 and slot bushing 123. The slot bolt 122 may be routed through an aperture in the first beam panel 105A, the arcuate slot 116 in the linkage 113, an aperture in the snubber assembly 121, and an aperture in the second beam panel 105B. The snubber assembly 121 may include multiple through-holes 124 such that the snubber assembly 121 can act as a supplemental compressively deformable support member operating as a stop or limiter to protect the elastically deformable members 117 in the case where the elastically deformable members 117 are subject to a force above their intended capacity. In one example, the snubber assembly 121 may be constructed of a progressive-type rubber such as those manufactured by Timbren Industries. As a linkage 113 rotates about the linkage pivot bushing 114, a rib 125 on a back side of the elastically deformable members 117 may be brought into contact with the snubber assembly 121 thereby compressing the snubber assembly 121 to dissipate a portion of the force associated with movement/response of the shock absorbing assembly 112 and maintain the elastically deformable members 117 in contact with the central body surface 110 of the central body portion 109.

Figure 7:
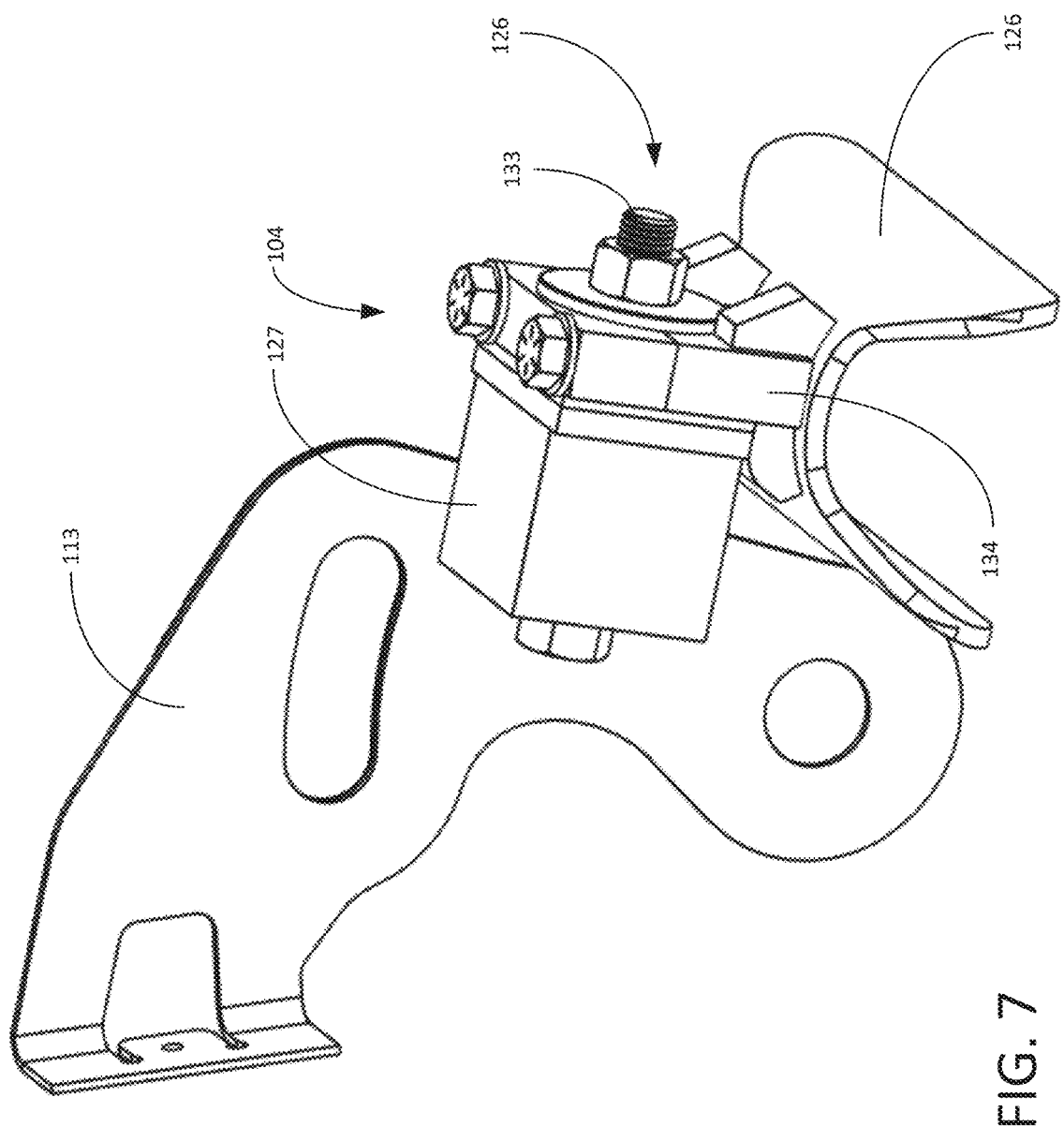
FIG. 7 shows a cut-away view of an axle support of a walking beam suspension assembly.

Referring again to FIGS. 6-7, the shock absorbing assembly 112 may include axle supports 104 disposed between and coupled to (e.g., welded to) the linkage 113. Referring to FIG. 7, an axle support 104 may include an axle mounting bracket 126 operably coupled to a tube portion 127 with the tube portion 127 being disposed between and coupled to (e.g., welded to) the linkages 113. Referring again to FIGS. 4-5, the axle support 104 may be coupled to the linkage 113 at a position 139 on the linkage 113 that is between the coupling 140 of the linkage 113 to the beam portion 102 and the coupling 141 of the linkage 113 to the one or more elastically deformable members 117.

Referring again to FIG. 8, a view of the axle support 104 is shown with the tube portion 127 removed. Internal to the tube portion 127, the axle support 104 may include a rigid torsion shaft 128 (e.g., a shaft constructed from high-grade steel such as 4140 steel) disposed internal to one or more elastic torsion rounds 129 (e.g., Progressive-type rubber members). The torsion rounds 129 may be configured to permit a degree of flex and/or rotation of the axle mounting bracket 126 and attached axle members 201 relative to the rest of the walking beam suspension assembly 101 to further dissipate vibrations and/or shock. A bolt 133 may be routed through the torsion shaft 128 and the tube portion 127, via a through-hole 135 in the torsion shaft 128, where it may be received by a bracket portion 134 of the axle mounting bracket 126 so as to couple the axle mounting bracket 126 to a linkage 113.

Figure 1:
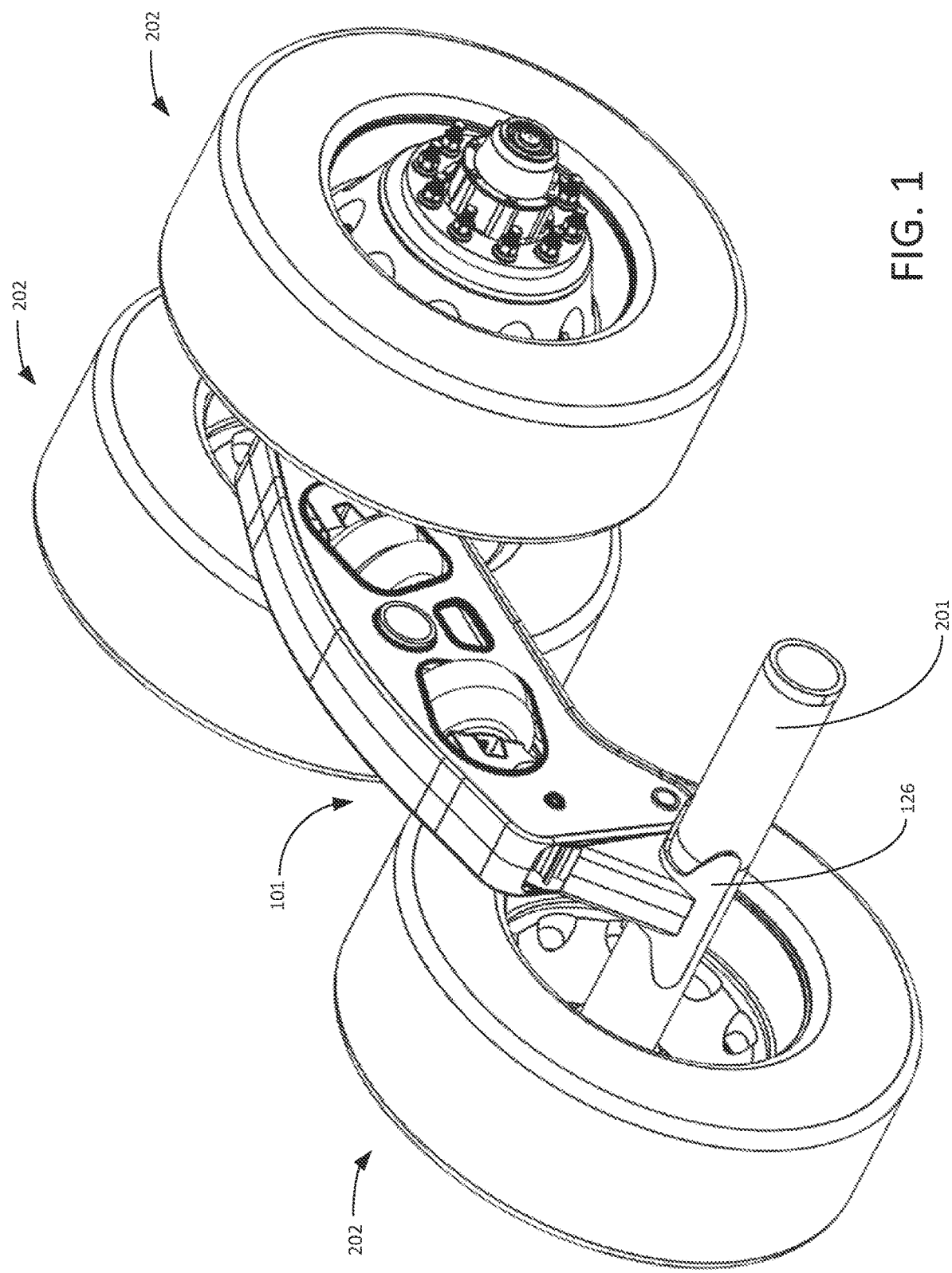
FIG. 1 shows a cut-away environmental view of a walking beam suspension assembly.
Figure 2:
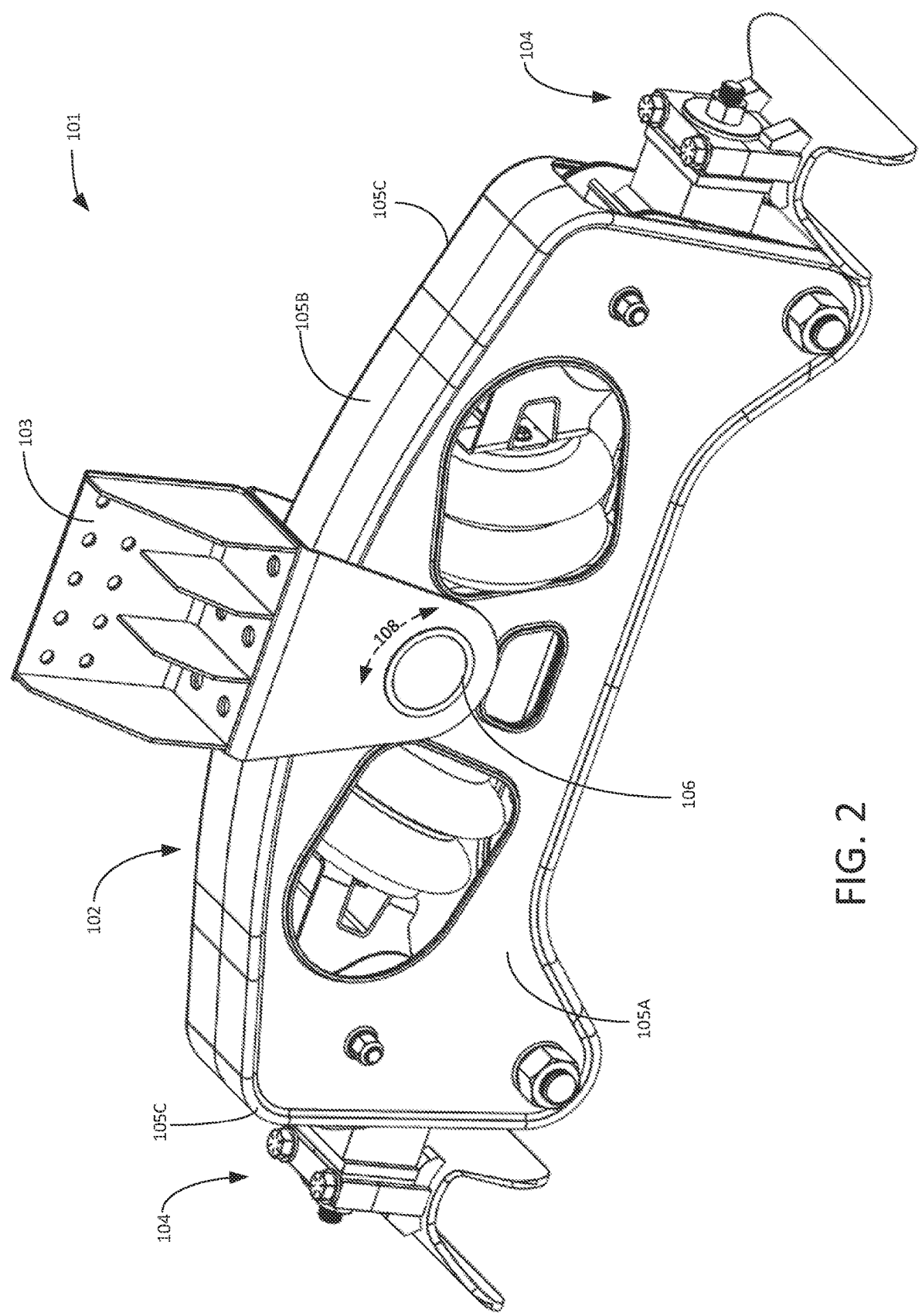
FIG. 2 shows a perspective view of a walking beam suspension assembly.
Figure 8:
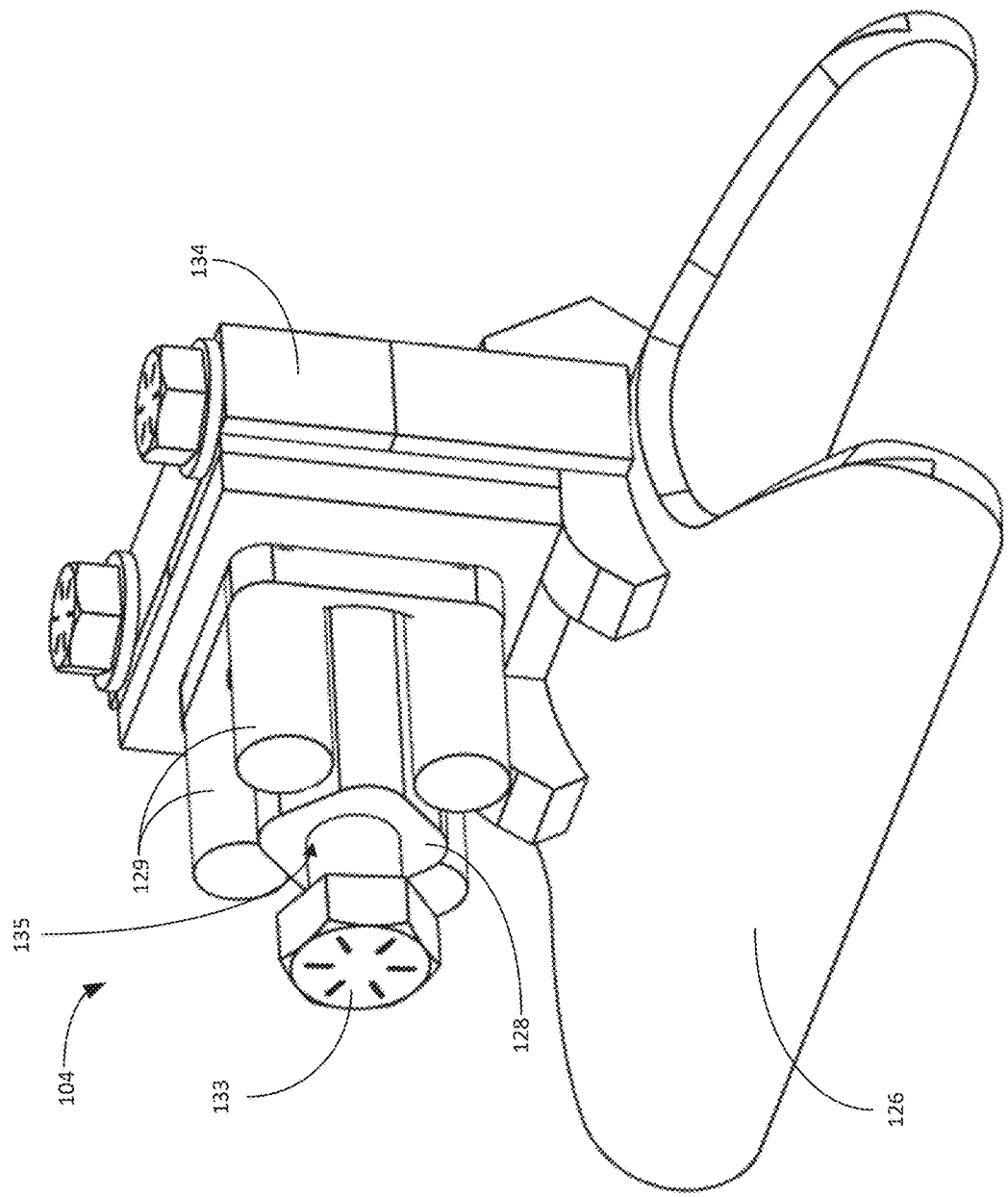
FIG. 8 shows a cut-away view of an axle support of a walking beam suspension assembly.
Figure 9:
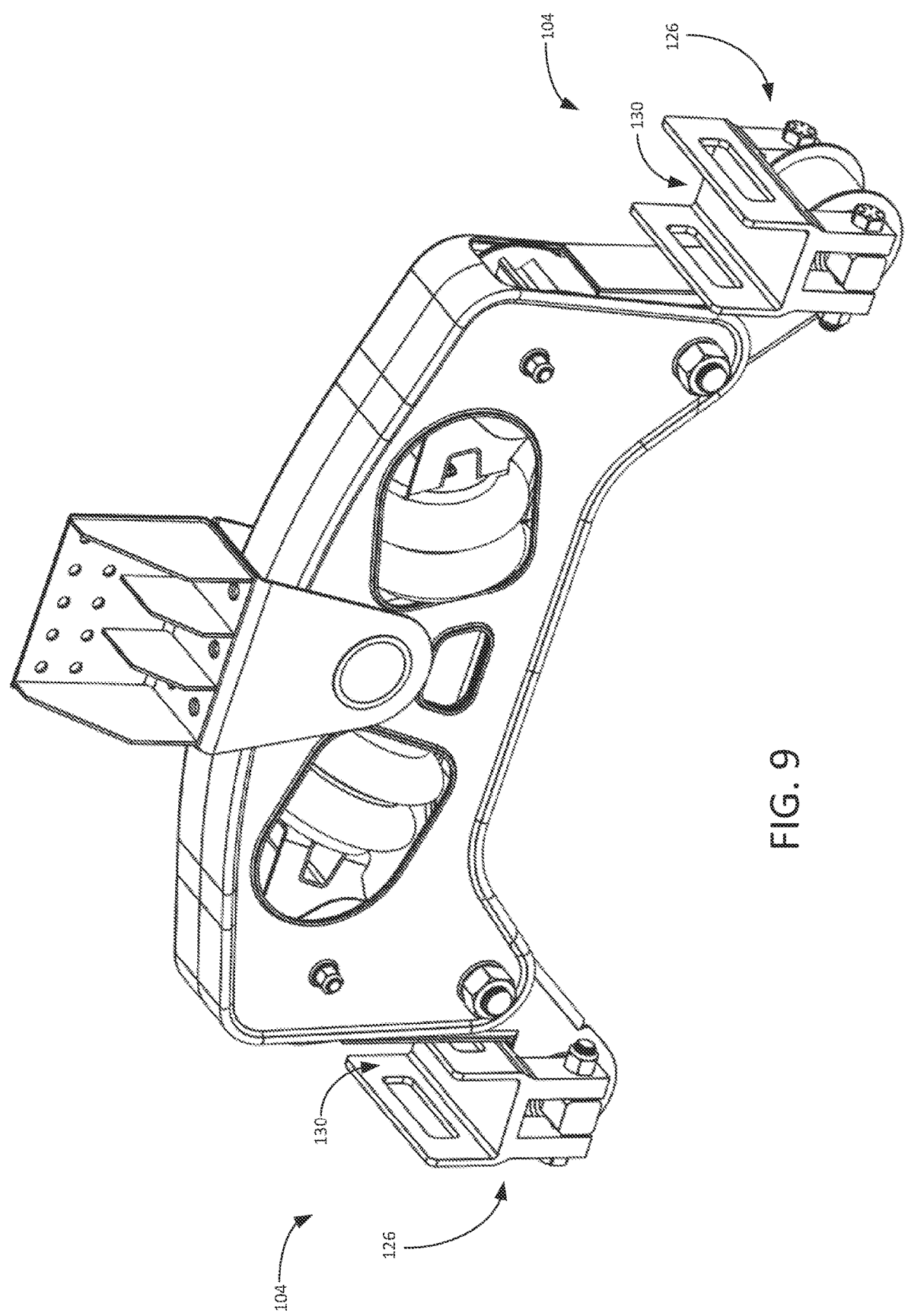
FIG. 9 shows a perspective view of a walking beam suspension assembly.
Figure 10:
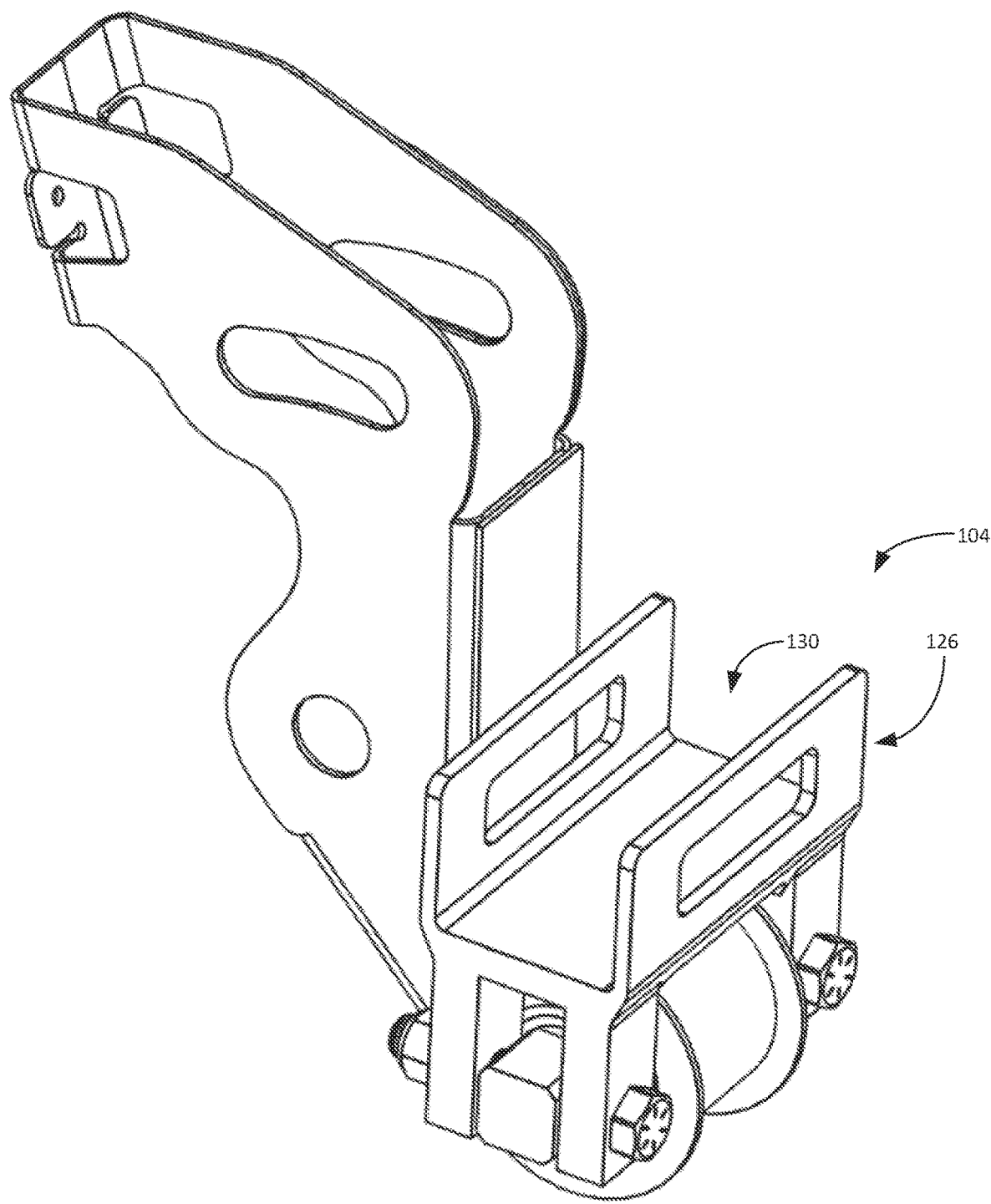
FIG. 10 shows a cut-away view of an axle support of a walking beam suspension assembly.
Figure 11:
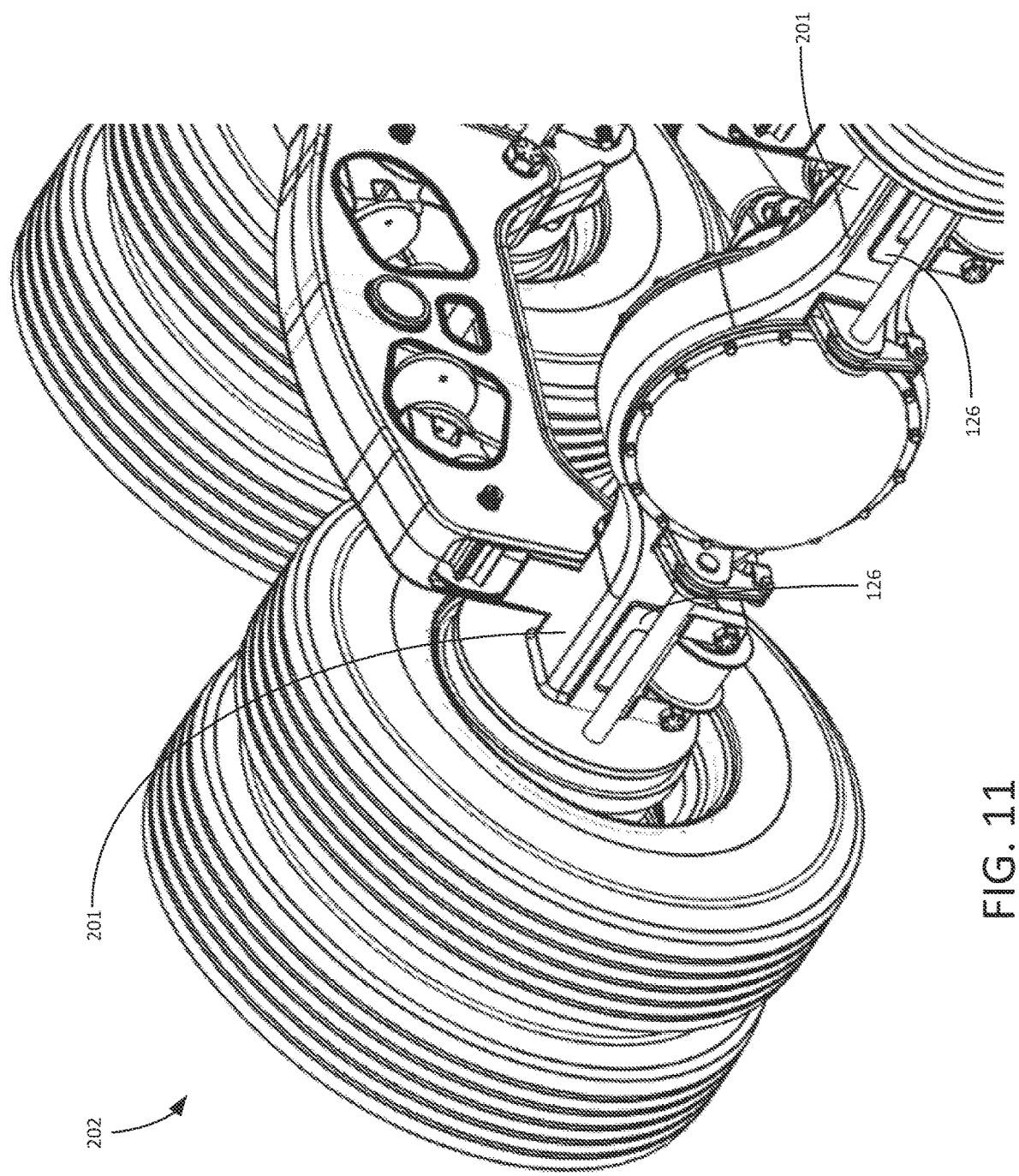
FIG. 11 shows an environmental view of a walking beam suspension assembly.

Referring to FIGS. 1 and 8, the axle mounting bracket 126 may be a saddle-type bracket where the axle mounting bracket 126 includes and arcuate portion dimensioned to at least partially encircle a cylindrical axle members 201 of the vehicle wheel assemblies 202 (e.g., as on various trailer axle members 201). Referring to FIGS. 9-11, the axle mounting bracket 126 may include one more wall structures defining a substantially rectilinear channel portion 130 dimensioned to at least partially receive rectilinear axle members 201 of the vehicle wheel assemblies 202 (e.g., as on various truck axle members 201).

One skilled in the art will recognize that the herein described components, devices, objects, operations, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

It is further contemplated that each of the embodiments of the method described above may include any other step(s) of any other method(s) described herein. In addition, each of the embodiments of the method described above may be performed by any of the systems described herein.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. A walking beam suspension assembly comprising:
   a beam portion;
   at least one mounting bushing disposed through the beam portion;
   a linkage rotatably coupled to the beam portion via at least one linkage pivot bushing;
   one or more elastically deformable members coupled to the linkage; and
   at least one snubber assembly including at least one snubber member coupled to the beam portion via at least one through-bolt routed through: an aperture in the beam portion, an at least partially arcuate slot in the linkage, and an aperture in the at least one snubber member.

2. An axle support comprising:
   a tube portion;
   a rigid torsion shaft disposed within the tube portion;
   one or more elastic torsion rounds disposed about the rigid torsion shaft within the tube portion; and
   a through-hole disposed in the rigid torsion shaft and configured to receive a bolt.

3. The axle support of claim 2, further comprising:
   at least one axle mounting bracket.

4. The axle support of claim 3, wherein the at least one axle mounting bracket includes:
   at least one at least partially arcuate axle mounting bracket.

5. The axle support of claim 3, wherein the at least one axle mounting bracket includes:
   at least one substantially rectilinear axle mounting bracket.

6. A walking beam suspension assembly comprising: a beam portion; a linkage rotatably coupled to the beam portion; one or more elastically deformable members operably coupled to the linkage; and at least one axle support operably coupled to the linkage, wherein the axle support is operably coupled to the linkage at a position on the linkage that is between the coupling of the linkage to the beam portion and the coupling of the linkage to the one or more elastically deformable members.

7. The walking beam suspension assembly of claim 6, wherein the at least one axle support includes:
   at least one axle mounting bracket.

8. The walking beam suspension assembly of claim 7, wherein the at least one axle mounting bracket includes: at least one at least partially arcuate axle mounting bracket.

9. The walking beam suspension assembly of claim 7, wherein the at least one axle mounting bracket includes: at least one substantially rectilinear axle mounting bracket.

10. The walking beam suspension assembly of claim 6, wherein the one or more elastically deformable members includes:
    one or more air bags operably coupled to at least one compressed air source.

11. The walking beam suspension assembly of claim 6, wherein the one or more elastically deformable members includes:
    one or more rubber structures.

12. The walking beam suspension assembly of claim 6 wherein the linkage is configured to rotate, relative to a neutral position of the one or more elastically deformable members, from about +15 degrees to −15 degrees.

13. The walking beam suspension assembly of claim 6, further comprising:
at least one frame mounting bracket coupled to the beam portion.

14. The walking beam suspension assembly of claim 6, wherein the at least one axle support includes: a tube portion; a rigid torsion shaft disposed within the tube portion; and one or more elastic torsion rounds disposed about the rigid torsion shaft within the tube portion.

15. The walking beam suspension assembly of claim 6, further comprising:
at least one snubber assembly.

\* \* \* \* \*